April 6, 1954
R. G. CADY
2,674,381
DISCRETE MATERIAL CONVEYER AND DISTRIBUTOR
Filed Aug. 27, 1946
5 Sheets-Sheet 1
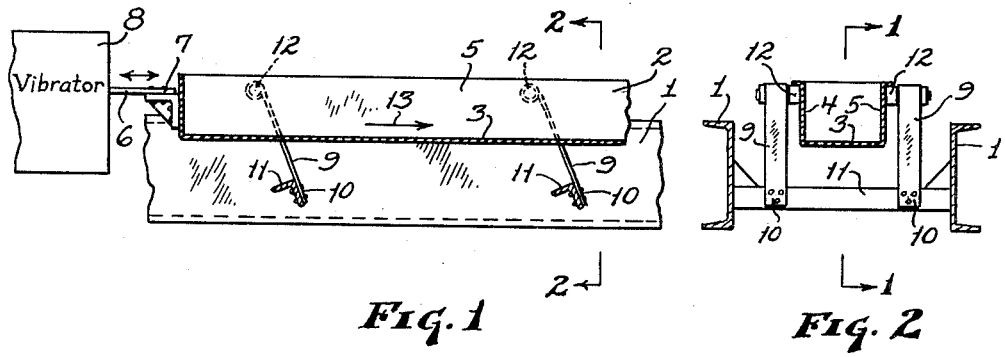
Fig. 1
Fig. 2
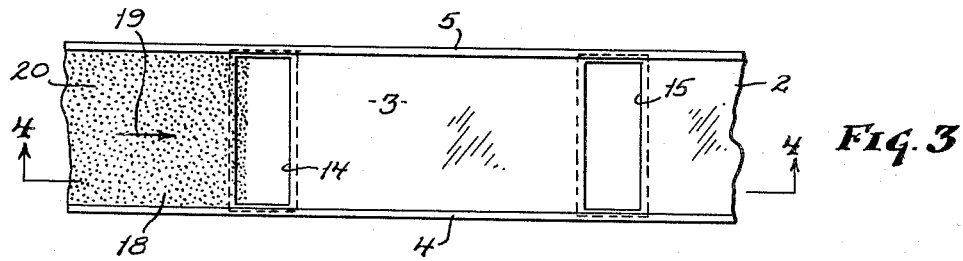
Fig. 3
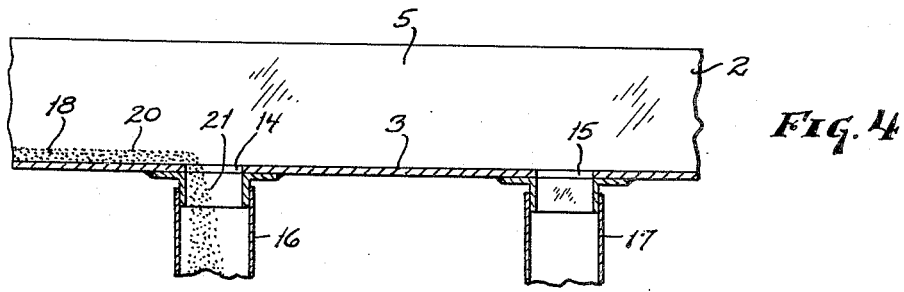
Fig. 4
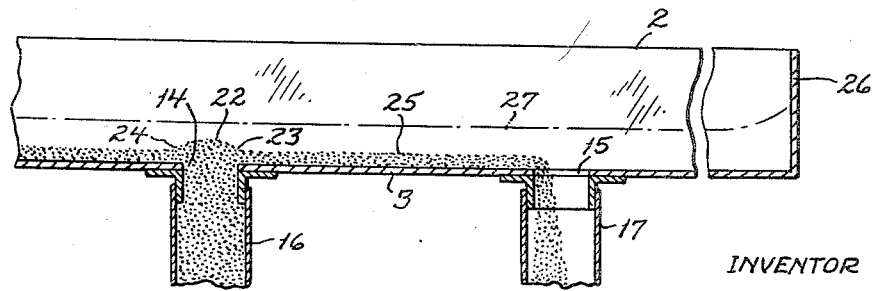
Fig. 5
INVENTOR
Robert G. Cady
BY Harry P. Canfield
ATTORNEY

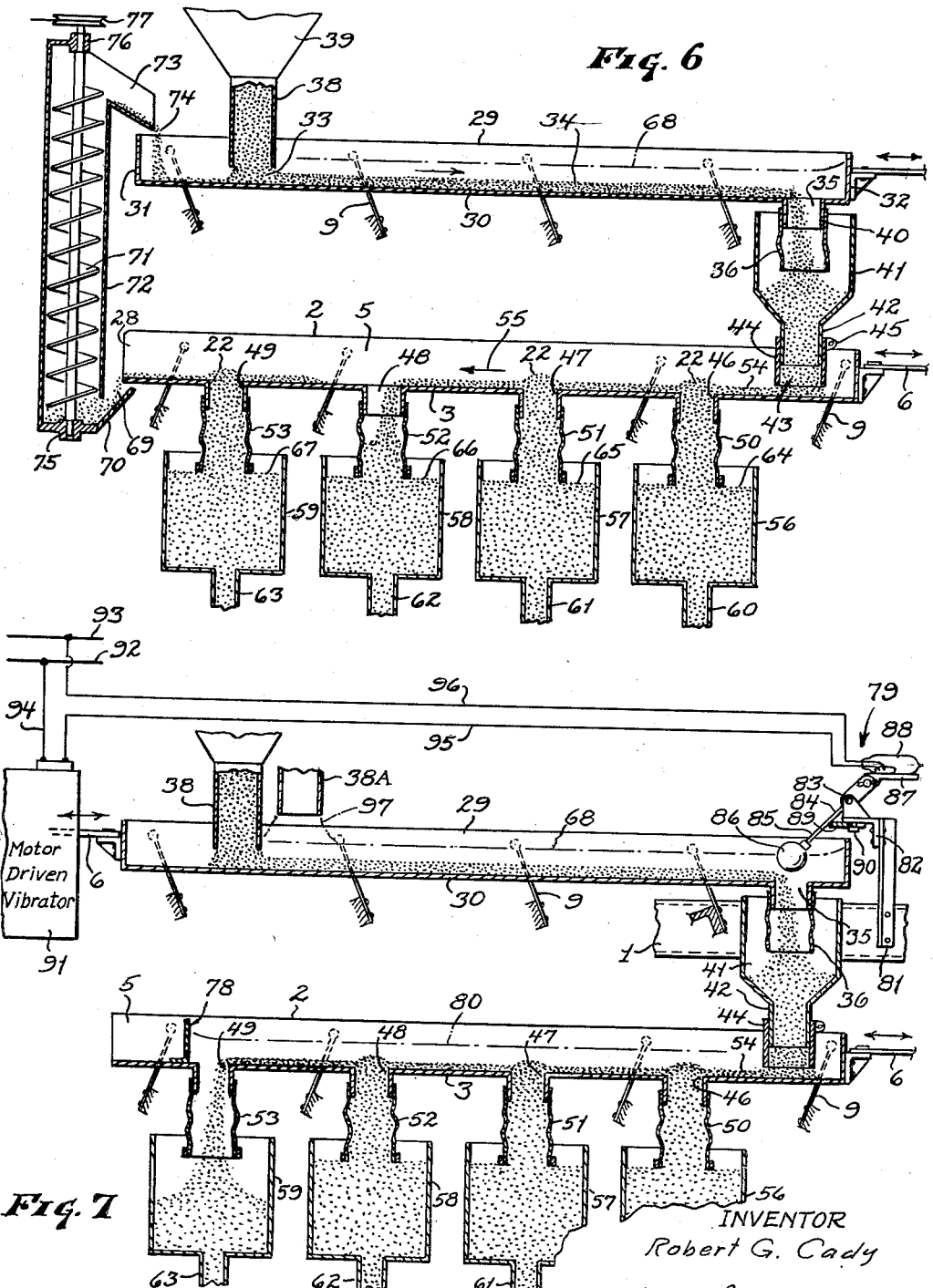

INVENTOR
Robert G. Cady
Harry R. Canfield
BY
ATTORNEY

April 6, 1954 R. G. CADY 2,674,381
DISCRETE MATERIAL CONVEYER AND DISTRIBUTOR
Filed Aug. 27, 1946 5 Sheets-Sheet 4
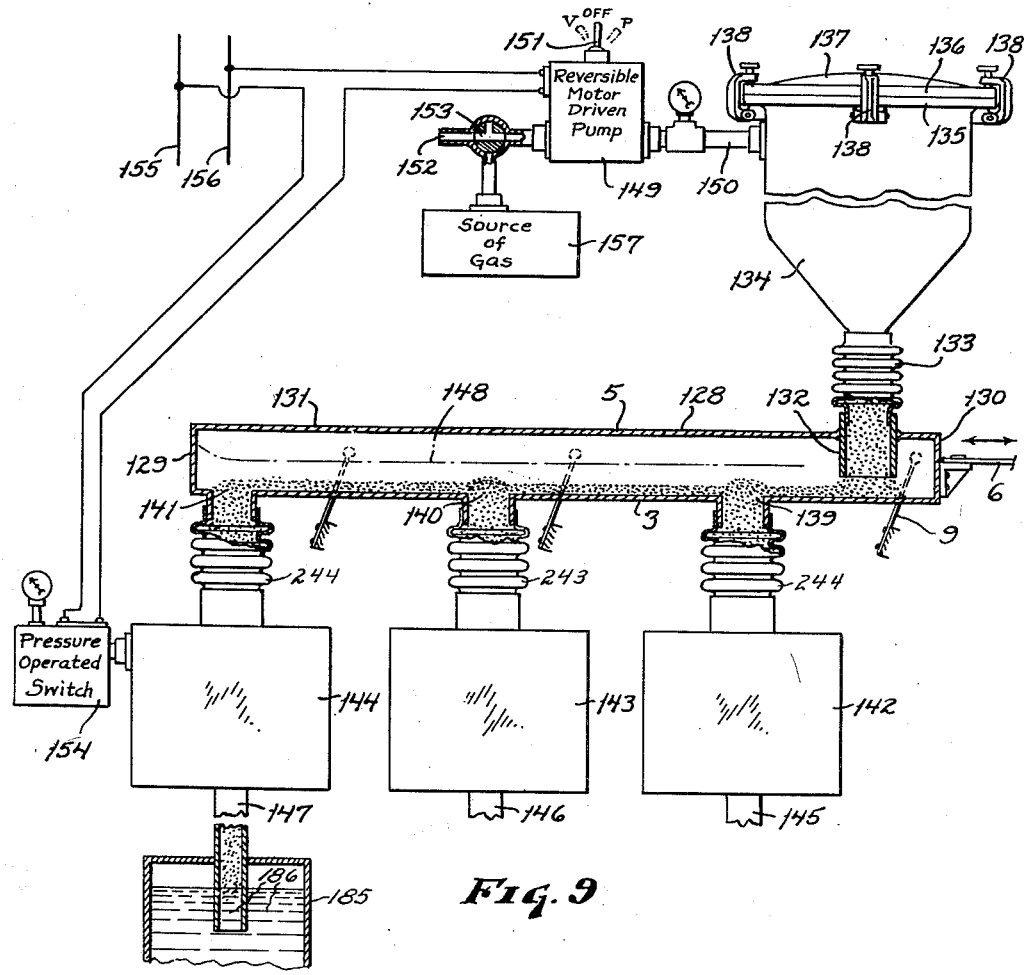
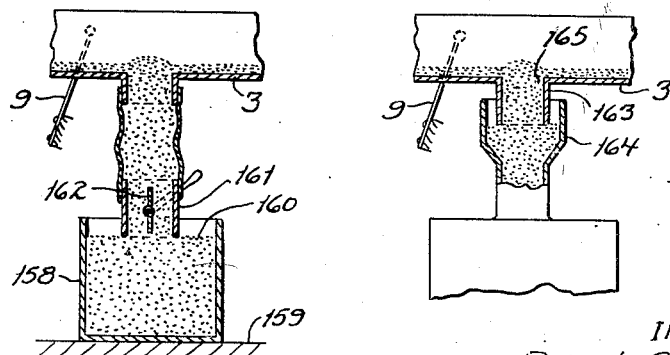
Fig. 9
Fig. 10
Fig. 11
INVENTOR
Robert G. Cady
BY Harry P. Canfield
ATTORNEY April 6, 1954  R. G. CADY  2,674,381
DISCRETE MATERIAL CONVEYER AND DISTRIBUTOR
Filed Aug. 27, 1946  5 Sheets-Sheet 5

INVENTOR
Robert G. Cady
BY Harry R. Canfield
ATTORNEY

Patented Apr. 6, 1954

2,674,381

UNITED STATES PATENT OFFICE 2,674,381

DISCRETE MATERIAL CONVEYER AND DISTRIBUTOR

Robert G. Cady, Westfield, N. Y., assignor to Ajax Flexible Coupling Co., Inc., Westfield, N. Y., a corporation of New York Application August 27, 1946, Serial No. 693,238

14 Claims. (Cl. 214—17)

This invention relates to vibratory conveyors.

Vibratory conveyors are known, one form of which comprises an elongated channel, or pan, on the bottom or floor of which, and at one end thereof, discrete material, such as sand, chemicals in granular form, grain or the like to be conveyed is placed; and the channel or pan is vibrated or rapidly reciprocated longitudinally and the vibratory movement of the conveyor floor is such as to cause the material to flow or be conveyed longitudinally over the floor of the channel or pan in a stream, toward the other end.

The present invention relates in general to conveyors of this class.

In the adaptation of such conveyors to the various arts, it has been found desirable to direct or distribute the stream of conveyed material into a plurality of containers or receivers, or to supply it to different points or parts of a processing apparatus. To this end it has been proposed to divide the conveyor longitudinally so that the material is directed to flow from the end of the conveyor in separate parallel streams.

In the development of this art, it became evident that advantages would result from withdrawing the material from the conveyor at a succession of points along the stream or line of flow thereover, for purposes such as those referred to, by providing a series of discharge outlets in the vibrating pan bottom or floor, through which the material could fall by gravity. This indicated the provision of gates to open and close the outlets, which gates would be constructed so that when any one was closed it would offer no obstruction to the flow of the material therebeyond to the next outlet, and so on.

This arrangement however has the disadvantage that if the material discharging through the outlets is to supply demands for material at a predetermined rate (constant or variable), for example the demands of a process, constant attendance at the gates would be necessary to open and close them at the right times, or, a complicated control system for operating the gates would be required.

Underlying the present invention is a principle of discharge control by which such gates or valves are rendered unnecessary, to start or stop or control the flow through the respective outlets.

It has been found that if a conduit is provided for each outlet into which the outlet discharges, and so associated with the outlet as to be leakproof as to material discharged into it; and with the outlets always open; then if any conduit and outlet become full, the vibrated material flowing over the conveyor floor will flow over the outlet, or over the end of the filled conduit, and be conveyed therebeyond, to other successive outlets, without interference with the conveying movement or flow of the material thereover. And that if material is drawn out of the filled conduit, it is automatically replaced by more material discharged through the open outlet into the conduit, and, if the material in the conduit goes to a process, it will thus automatically supply the demands of the process whether uniform and continuous, or intermittent, or variable, without gates or valves of any kind; so that gates or valves and manipulation or control thereof are obviated.

Also, it has been found that if at any time all of a succession of conduits and discharge outlets have in this manner become filled (for example when the rate at which discharge out of the outlets becomes less than the rate at which material is supplied to the conveyor), an obstruction to the stream of material on the conveyor floor, say at the down-stream end of the conveyor, will cause the material on the vibrating floor to accumulate in a layer of substantially uniform depth from end to end of the floor, and up to but not beyond a definite depth, depending upon the specific material; and that material in this layer will automatically feed down through the outlets when the demand for material thereat again increases.

This automatic discharge control principle is applicable to various uses besides that of supplying a process demand as mentioned. It may be used to maintain a preselected level or head of material in a tank or reservoir from which it is withdrawn; or to put into containers a preselected quantity or batch of material; etc., etc., and some of its various uses will hereinafter be described.

From the foregoing, it will be apparent that the primary object of the invention is to provide a vibratory conveyor apparatus which will discharge the material flowing thereover from one or more discharge outlets, along the line of flow on the conveyor, and automatically control the flow from the outlet or outlets to start it and stop it and regulate its rate of flow in correspondence wih the material supply requirements of the containers, apparatus, etc. to which the material is supplied, and without having to provide valves, gates, or control apparatus of any kind whatever to control or regulate the rate of flow.

Other objects are to provide such a conveyor apparatus as that referred to generally above which will automatically supply material to a reservoir, tank, or the like and maintain a predetermined level of the material therein.

Another object is to provide such a conveyor apparatus as that referred to generally above which will supply to a container or the like a measured quantity or batch of material.

Another object is to provide such a conveyor apparatus as that referred to generally above which may be hermetically sealed, whereby the material being conveyed and discharged and received may be subjected to superatmospheric pressure or to subatmospheric pressure, or to a selected chemical ambient gaseous atmosphere.

Another object is to provide generally a vibrator conveyor for discharging conveyed material from the line of flow along the conveyor and having improved means for controlling the rate of discharge.

Another object is to provide generally a vibratory material conveyor which discharges material from a plurality of outlets spaced along the line of flow of the conveyed material in an improved manner.

Other objects will be apparent to those skilled in the art to which the invention appertains.

The invention is fully disclosed in the following description taken in connection with the accompanying drawing, in which:

Fig. 1 is a longitudinal sectional view of a part of a conveyor of the class with which the invention may be practiced, and the view may be referred to the plane 1—1 of Fig. 2;

Fig. 2 is a sectional view from the plane 2—2 of Fig. 1;

Fig. 3 is a plan view and Fig. 4 is a longitudinal sectional view from the plane 4—4 of Fig. 3 illustrating a fragment of a conveyor such as that of Fig. 1, and for explaining certain characteristics of the flow of material thereover;

Fig. 5 is a view similar to Fig. 4 for explaining another characteristic of the flow of material;

Figure 8:
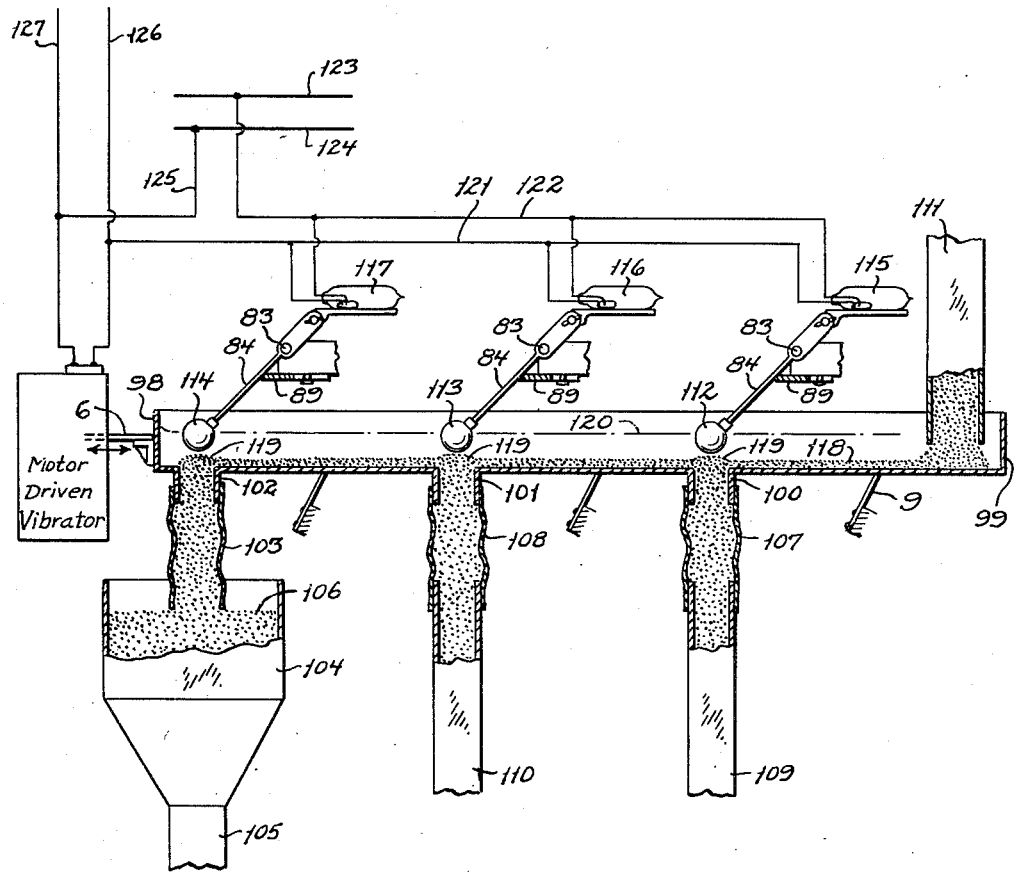
Figure 12:
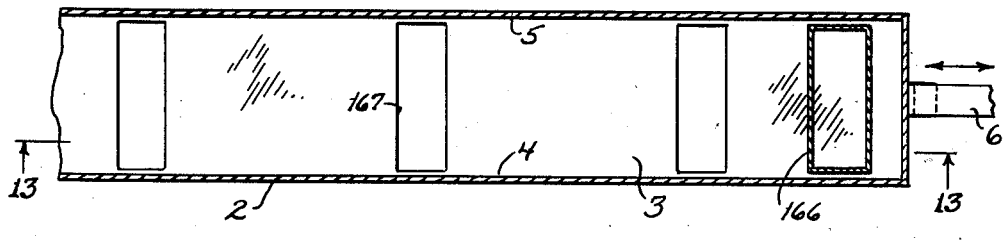
Figure 13:
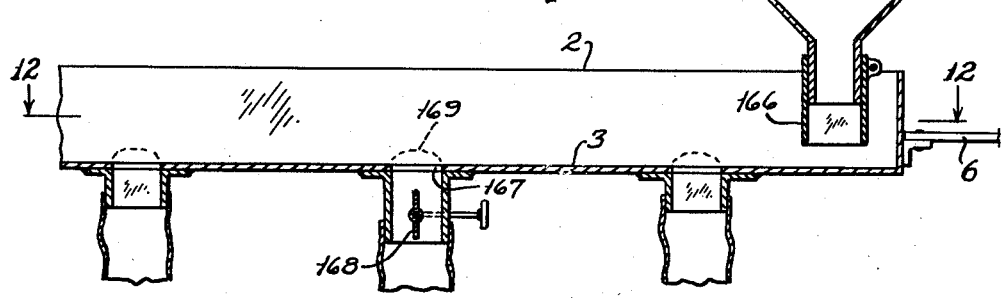
Figure 14:
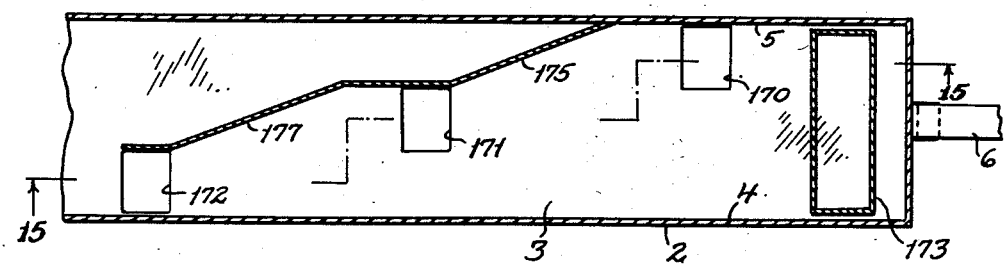
Figure 15:
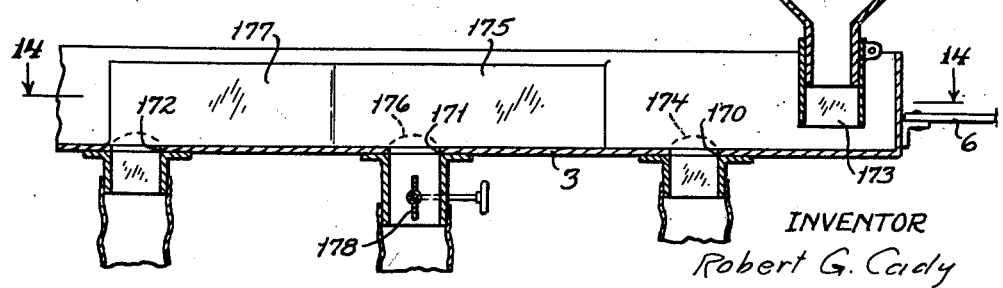

Figs. 6, 7, 8, and 9 are views illustrating respectively different embodiments of the invention, in which conveyed material is distributed and continuously discharged into a number of stationary conduits or receptacles and the rate of flow thereto automatically controlled; the material in Fig. 9 being subjected to artificially modified ambient pressure or chemical atmosphere;

Fig. 10 is a fragmentary view illustrating the manner in which a removable receptacle may have a measured quantity or batch of material discharged thereinto by the conveyors of Fig. 6, 7, or 8;

Fig. 11 is a fragmentary view illustrating a modification of the discharge receiving conduits of Figs. 6, 7, and 8;

Fig. 12 is a sectional plan view from the plane 12—12 of Fig. 13; and Fig. 13 is a longitudinal sectional view from the plane 13—13 of Fig. 12; and illustrating certain modifications of the conveyors of the preceding figures which may be employed;

Fig. 14 is a sectional plan view from the plane 14—14 of Fig. 15; and Fig. 15 is a longitudinal sectional view from the staggered plane 15—15 of Fig. 14; and illustrating other modifications which may be employed.

Figures 16, 17:
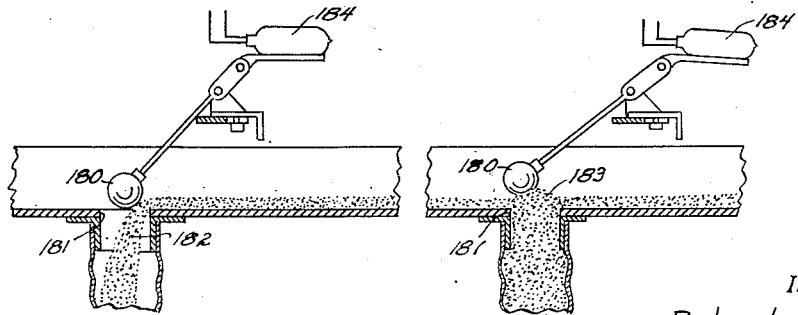

Figs. 16 and 17 are fragmentary views illustrating a modification of a part of Fig. 7 or of Fig. 8.

As mentioned above, a vibratory conveyor preferably comprises some construction of elongated tube, trough, or pan; a yieldable support for it; and a mechanism to reciprocate or vibrate it longitudinally in a manner to cause discrete material on the pan bottom to flow thereover.

In the practice of the present invention any suitable vibrator mechanism may be employed for this purpose since the vibrator mechanism per se constitutes no essential part of the present invention and it is therefore unnecessary to describe the same in detail. However, the preferred vibrator mechanism is one of the type disclosed in the patent to W. T. Shaler, 2,178,813, November 7, 1939. The vibrator mechanism of that patent comprises a rotary power driven mechanical vibrator; and the conveyor is supported independently of the vibrator and is connected to the vibrator to be vibrated or reciprocated thereby, by one or more flexible rod like connectors extending in the direction of the vibrator reciprocation. The conveyor is supported by flexible links or rod like supports spaced longitudinally along the conveyor and connected to a main frame at one end and at the other end connected to the conveyor, and disposed at an angle to the longitudinal direction of conveyor floor, so that as the conveyor is reciprocated longitudinally in one direction it has an upward component of movement, and vice versa, in the other direction, which contributes to the stream like flow of material.

In the accompanying drawing such a conveyor is shown in Figs. 1 and 2 comprising a stationary main frame 1—1, and at 2 a fragmentary end portion of a conveyor, the conveyor being in the form of an elongated sheet metal channel or pan having a planar bottom or floor 3 and upright side walls 4 and 5. The said reciprocatory rod like connector 6 is connected at one end at 7 to the end of the conveyor, and at the other end is connected to the "vibrator" which is indicated diagrammatically at 8. The supports for the conveyor are resilient bars or springs 9—9 each rigidly connected at its lower end at 10—10 to a transverse stationary frame element 11, and at opposite sides of the conveyor; and at its upper end is connected at 12 to the opposite side walls 4 and 5 of the conveyor, and disposed at an angle to the longitudinal direction of the conveyor floor 3. Discrete material on the floor 3 will be propelled forwardly in the direction of the arrow 13 in a stream like flow upon reciprocation of the conveyor floor by the "vibrator."

In other figures of the drawing vibrated conveyors are shown in more simplified form to simplify the drawing, and are identified as like or similar to that of Figs. 1 and 2 by having the said driving connector 6 and the supports 9 therefor.

The hereinbefore mentioned automatic discharge control and regulating principles will now be described in connection with Figs. 3, 4, and 5.

In Figs. 3 and 4, a fragment of a conveyor pan or channel is shown at 2 comprising a floor 3 and side walls 4 and 5. Transverse outlets 14 and 15, etc. are provided in the floor extending preferably substantially all the way from one side wall to the other. Beneath the outlets, conduits 16 and 17 are sealingly connected to the bottom of the floor and aligned with the outlets. These conduits are illustrated as of metal, but they may be of flexible material for example fabric, and then will function in the nature of flexible boots, so as to not oppose vibratory movement of the floor nor be themselves objectionably vibrated.

The pan 2 is vibrated as described hereinbefore, and discrete material 18 when supplied to the pan from a source not shown, flows over the pan floor 3 in the direction of the arrow 19, Fig. 3, and the rapid vibratory movement of the floor 3 causes the material to spread out and lie in a thin layer in the floor as shown at 20 as it progresses thereover.

In Figs. 3 and 4, the breast of the stream is shown as having reached the outlet 14 where it discharges downwardly therethrough as at 21 by gravity and into the conduit 16.

The lower end of the conduit 16 will supply this discharged material to a receiver of some kind not shown. The rate of supply or flow over the conveyor is assumed to be predetermined to be more than enough to satisfy the demand of this conduit 16, and the conduit 16 will therefore fill up with the material all the way up to and through the outlet 14, to the surface of the pan bottom or floor 3.

The flowing stream of material on the floor 3 then encounters some resistance to flow at the outlet, because the top of the column of material in the conduit 16 is, so to speak, rougher than the surface of the floor 3 itself, and the material tends to pile up as at 22, Fig. 5, in a transverse mound.

The vibratory movement of the floor 3 takes away material from the side 23 of the mound 22, and supplies material to the side 24 of the mound, so that the mound persists, but material flows from the side 23 and goes on away from the mound as at 25 in the same thin stream in which it approached the mound, and this stream 25 goes on to the next outlet 15 and fills it and forms a mound above it; and so on.

When the material is withdrawn from the lower end of any filled conduit, for example the conduit 16, and the column of material therein falls accordingly, the mound 22 collapses downward into the conduit until the rate of withdrawal is again reduced.

A short time after starting up of the conveyor the stream of material will fill all of any number of successive conduits; and form corresponding mounds at the outlets of those that are filled, and the stream of material will continue to flow over the pan floor and over all of the filled outlets; and from time to time some or all of the conduits may temporarily discharge fast enough to become only partly filled; and then later fill up again; and thereby the conduits are kept full or partly full automatically according to the rate of the material demand on the respective conduits; and the material is thereby controlled automatically to satisfy the withdrawal demands of the conduits.

If an obstructing wall such as that indicated at 26 in Fig. 5 be provided at the down stream end of the conveyor, then if at any time the rate of total or aggregate withdrawal of material through all of the conduits becomes less than the rate at which the material is supplied to the conveyor, the material will bank up against the wall 26 and this bank will progressively move upstream in the conveyor until a thick layer of accumulated material covers the conveyor floor. This layer will be deeper than the original stream, and this layer will rise to but not beyond a definite level or depth, depending upon the physical characteristics, size, weight, etc. of the discrete particles of the material; and at 27 is indicated such a layer for one kind of material. When the rate of withdrawal from one or more of the conduits again increases, the material stored in this layer will automatically discharge into the conduits and be used up to maintain the conduits filled or partly filled as before. Some applications of these automatic principles of discharge and distributing control will now be described.

In the embodiment of the invention shown in Fig. 6, a distributing conveyor is shown at 2, having a floor 3, and having a connector 6 at its upstream end for vibrating it as described hereinbefore, and being supported by the supports 9—9; the conveyor being open, as at 28, at its downstream end.

At 29 is shown a supply conveyor vibrated by a connector 6, and supported on supports 9—9, and having a floor 30, and closed at both ends at 31 and 32. Material is supplied to the supply conveyor at the point 33, and flows over the floor 30 in a stream 34 and discharges through an outlet 35 at the downstream end and into a conduit 36. The material may be supplied at 33 from a supply conduit 38, which, if preferred may be at the lower end of a hopper 39, and the lower end of the conduit 38 is preferably disposed a suitable distance from the floor 30 for a purpose to be described. The material may be supplied to the conduit 38 from any suitable source or processing apparatus, and by any suitable means, and continuously at a constant rate, or at a variable rate, or intermittently.

The conduit 36 may be made of flexible material such as leather or fabric, and attached to the conveyor 29 in communication with the outlet 35 in any suitable manner. The connection shown in the drawing comprises a short tube 40 attached to the floor bottom 30, and the flexible conduit 36 is telescoped thereover and secured thereto by any suitable means.

The conduit 36 projects into the upper open end of a feed hopper 41 having a conduit portion 42 at its lower end, which is disposed a suitable distance from the floor 3 of the conveyor 2; and this distance is preferably made adjustable by providing an extension 44, telescoped over the conduit portion 42 and secured thereto in adjusted position by any suitable clamping means such as that indicated at 45.

The floor 3 of the distributing conveyor 2 is shown as having four outlets 46 to 49 inclusive (although fewer or more may be used) and these outlets may be similar to those described above in connection with Figs. 3, 4, and 5 and have flexible conduits 50 to 53 inclusive sealingly communicating therewith in any suitable manner, for example in the manner described for the conduit 36.

Material is supplied from the feed hopper 41 to the conveyor floor 3 and flows thereover in a stream 54 in the direction of the arrow 55, and discharges downwardly through the outlets 46 to 49 and into the conduits 50 to 53.

The conduits 50 to 53 project into the upper open ends respectively of receivers 56 to 59 inclusive, having withdrawal conduits 60 to 63 by which material in the receivers 56 to 59 is withdrawn.

In this form of the invention, it is contemplated that the material withdrawn by the conduits 60 to 63 goes to a processing apparatus or to a number of processing apparatus units; and that the rate of withdrawal may vary from time to time at all of these conduits; or that the rate of withdrawal from one conduit may increase or decrease with respect to that from another at different times; and to this end, it is desirable to maintain a reservoir supply of material in the receivers 56 to 59, and in general to maintain the material at a predetermined level or head in each of the receivers 56 and 59, for example the levels indicated at 64 to 67 inclusive.

In order to insure that none of the receivers 56 to 59 will ever become emptied even if all of the conduits 60 to 63 are withdrawing material at the maximum demand rate and all at the same time, the material will be supplied to the floor 3 by the feed hopper 41 at a sufficiently high predetermined rate slightly in excess of the aggregate maximum withdrawal rate; and this is done by disposing the lower end of the conduit extension 44 a corresponding distance from the floor 3. The flow to the floor 3 cannot exceed this rate, because if it tends to do so, the material will accumulate under the extension 44 and block its discharge therefrom.

In this connection, in order to insure that the feed hopper 41 will never be emptied, the rate of supply to the hopper 41 must be at least as great as the maximum rate of feed from it, and this predetermines the rate at which material must be fed at 33 to the supply conveyor 29.

If at any time the hopper 41 should fill up due to some variation of the rate of supply at the point 33, or variation of the rate of withdrawal at the conduits 60 to 63, then the rising level of the material in the hopper 41 will come up to the lower end of the conduit 36 and block further discharge from the conduit 36 into the hopper 41; and the conduit 36 and the outlet 35 will fill up; and the conveyor 29 will begin to fill (as described in connection with Fig. 5) approaching a level indicated for example by the broken line 68, and ultimately this level will rise to the lower end of the supply conduit 38, and block off further supply of material thereat. When at a subsequent time the level in the hopper 41 begins to fall, the accumulated material in the supply conveyor 29 will begin to discharge downwardly out of the outlet 35 into the hopper 41, and the level 68 will fall, and the supply at the point 33 will be resumed.

By these provisions, the stream 54 of material flows over the floor 3 of the distributing conveyor 2 at a suitably adjusted depth regradless of variations in the rate of supply of fresh material to the conduit 38.

For an average rate of withdrawal from the conduits 60 to 63, the material of the stream 54 will fill all of the receivers 56 to 59, and the material accumulating therein will rise to the levels 64 to 67 at the lower ends of the conduits 60 to 63, whereupon further discharge from these conduits into the receivers will be cut off at these levels; and the conduits 50 to 53 and their associated outlets will then become filled, and mounds 22—22 will form at the outlets as described in connection with Figs. 3 to 5, and in that event the excess of supply to the distributing conveyor floor 3, which excess insures that the maximum aggregate demand of the conduits 60 to 63 can always be satisfied, will flow as at 69 out of the open end 28 of the conveyor 2.

If the demand at the conduits 60 to 63 continues at the average rate, material withdrawn thereby is continuously supplied to the associated receivers; and this continues if the demand should fall below the average rate. If at any time the demand on any conduit for example the conduit 62 should increase above the average, it might withdraw material from the receiver 58 faster than it could be supplied by the stream 54, and the material in the conduit 52 would fall therein below the outlet 48 (as has been illustrated for this conduit in Fig. 6) and the on-coming stream 54 will then all fall through the outlet 48 into the conduit 52 to supply this increased demand. If this increased demand persisted for a substantial length of time, it might cut off or starve the supply to the outlet 49 and conduit 53, but when the demand of the conduit 62 is again restored to the average, or less than the average, then the receiver 58, or as the case may be, the receivers 58 and 59 will again fill up to their said levels.

Whenever the excess of the stream flows as at 69 from the open end of the conveyor, it discharges into a sump 70. A rotating elevating screw 71 is provided on a generally vertical axis, the lower end of which projects into the sump 70, and it lifts the material deposited therein through a screw tube 72, and discharges it at the upper end of the screw into a spout 73, which discharges as at 74 into the upstream end of the supply conveyor 29. The screw 71 may have bearings at 75 and 76 and be rotated by any suitable drive indicated at 77.

In an extreme instance, if all of the conduits 60 to 63 should be withdrawing material at the minimum rate or in fact if the withdrawal thereat should be entirely stopped, all or most of the stream 54 on the conveyor floor 3 would be excess material and would be elevated and discharged into the supply conduit 29 and be added to the supply at the point 33.

The hopper 41 would then be receiving material faster than it discharges it, and it would fill up and block the conduit 36 and cause the conveyor 29 to fill up to the level 68 and cut off further supply from the supply conduit 38. Thereafter, the material discharged from the hopper 41 into the stream 54 will circulate around in the system until increased demand at one or more of the conduit 60 to 63 is resumed; the circulating material flowing over the floor 3, and being elevated and discharged to the floor 30 at one end and discharged into the hopper 41 at the other end, to supply the stream 54, the material on the floor 30 being maintained at its level 68 and blocking off the supply conduit 38 and preventing the addition of fresh material to the circulating material.

In general therefore, as will now be apparent, the withdrawing conduits 60 to 63 will always be continuously supplied by receivers 56 to 59 regardless of variations in the rate of withdrawal at these conduits; and the material in the receivers 56 to 59 will be maintained substantially at a constant head or level therein; and the rate of supply of fresh material to the system at the point 33 can never overflow or flood the system even if withdrawal at the conduits 60 to 63 should be shut off; and that all the features of regulation above described are effected without the utilization of any kind of movable control valve or complicated control system of any kind; and all of the openings, outlets, conduits, etc. over or through which the material flows are at all times open, the material itself functioning as the flow regulating means or medium.

In Fig. 7 is shown another embodiment of the invention. The distributing conveyor 2 is substantially the same as that described for Fig. 6 except that it has at the downstream end thereof a transverse end wall 78; and the supply conveyor 29 is substantially like that of Fig. 6 except that the connector 6 is at the upstream end of the conveyor. The form of Fig. 7 has two modes of operation and the first one will be described in connection with a material supply conduit 38 for the conveyor 29 substantially the same as that in Fig. 6; (a supply conduit 38A and a float switch arrangement shown generally at 79 being involved in the second mode of operation to be described later).

In view of the more complete description of Fig. 6 a brief description here will suffice for Fig. 7. Material supplied to the floor 30 of the supply conveyor 29 by the conduit 38 flows thereover and discharges into the hopper 41 and thence through the adjustable conduit extension 44 to the floor 3 of the distributing conveyor 2, flowing thereover in a stream 54, and supplying the material to the receivers 56 to 59; and filing the conduits 50 to 53 and outlets 46 to 49; the material being shown in the drawing as in the process of filling the receiver 59 through the outlet 49.

Whenever, due to a diminished total demand for material at the withdrawing conduits 60 to 63, all of the conduits and outlets fill up at the conveyor 2, the transverse wall 78, blocking the downstream end of the stream, will cause the conveyor 2 to fill up to its said definite level indicated in broken line at 80. This rising level will block off the lower end of the conduit extension 44 and the feed hopper 41 will fill up and block off further supply to the hopper at the lower end of the conduit 36. This will cause the material to begin to fill the supply conveyor 29 which is supplying material through the outlet 35 to the hopper 41; and the material on the floor 30 of the supply conveyor 29 will rise to its aforesaid level 68 and block off further supply at the lower end of the conduit 38.

If withdrawal at the conduits 60 to 63 is cut off, all flow of material will cease, but if there is a continuous or intermittent or variable demand at the conduits 60 to 63, the material in the conveyor 2 may never rise to the level 80, or may rise to that level and then fall again, and if the demand be sufficiently great, the material in the conveyor 29 will never rise to its level 68 and cut off the supply of material. Here again it is assumed that the rate of supply to the supply conveyor 29 at the conduit 38, whether continuous and uniform, or intermittent, is at its average sufficient to supply the maximum demand of all of the conduits 60 to 63.

Thus the system of Fig. 7 automatically regulates to maintain a demand-satisfying supply of material for the conduits 60 to 63, however variable or intermittent the demand may be, and automatically controls the rate of supply of fresh material at the conduit 38 whereby the system cannot be flooded with material.

Both conveyors 2 and 29 in this form, as in the form of Fig. 6, continuously vibrate.

According to the second mode of operation of the form of Fig. 7, the vibration of the supply conveyor 29 is stopped whenever the rate of withdrawal from the conduits 60 to 63 falls in the aggregate below a certain minimum, or is cut off altogether.

For this second mode of operation, the float switch 79 referred to above is provided.

In this connection, it should be first interjected (and with reference to Fig. 5 and the explanation thereof) that, when the material on the floor of the conveyor, because of reduced rate of withdrawal of the material through the floor outlets, begins to accumulate on the floor and ultimately attains a predetermined definite level of material, as at 27, Fig. 5, a light weight solid such as a block of wood or a hollow sheet metal ball or the like, will float on the material and rise with its level, with buoyancy similar to floating in liquid, so long as the floor upon which the layer of material forms is in vibratory movement; and I utilize this principle as follows, referring again to Fig. 7. One or more uprights 81 are mounted upon the stationary frame, a part of which is shown at 1, and a transverse angle section member 82 is connected to an upper portion of the upright, and thereon is mounted a bearing 83 upon which is intermediately pivoted an arm 84, one end portion 85 having connected thereto a hollow sheet metal float ball 86, and the other end portion 87 having mounted thereon a mercury tube contactor 88.

The ball 86 is preferably disposed generally in vertical alignment with the outlet 35 of the supply conveyor floor 30, and at a distance from the floor 30 less than the depth to which the material will form the thick layer 68 as described. The vertical position of the float ball 86 may be adjusted by adjusting the position of a stop 89 engaging at its end the arm portion 85, and adjustable horizontally, as viewed in Fig. 7, on one leg of the angle section piece 82, and secured in adjusted position by a screw 9. When the ball 86 is in its lowermost position which it assumes by the action of gravity, the mercury contactor 8 is in its contact closed position.

The motor driven vibrator 91 starts when supplied with current and stops when the current is cut off, by means well known. Current to energize the controller 91 is supplied by a circuit comprising mains 92 and 93, and wires 94, 95, and 96, with which the switch 88 is connected in series.

Rise of the float ball 86 will move the switch 88 to its open circuit position and stop the vibrator 91.

Whenever in the operation of the apparatus as above described, the material in the conveyor 29 begins to accumulate a layer on the floor 30, this layer increasing in depth raises the ball 86 at a level determined by the adjustment described for the ball, and cuts off and stops the vibrator 91.

The vibrator for the conveyor 2 keeps on vibrating, so that an increased demand at any one or all of the conduits 60 to 63 causes material from the layer 80 to collapse and discharge down through the outlets, and when, accordingly, material begins to flow out of the hopper 41 again, the material in the layer 68 of the conveyor 29 immediately above the outlet 35 will collapse and discharge downwardly therethrough, and the ball 86 being adjacent to this outlet will accordingly fall and close the switch 88 and start the vibrator 91 again, whereby the accumulated layer in the conveyor 29 will be redistributed and flow to the outlet 35 and resume the supply of material as will be understood.

When the float ball switch described is utilized, it is not necessary to have the conduit 38 project into the conveyor 29 and terminate at a cut off distance from the floor 30, because the ball 86 upon stopping the conveyor 29 from vibrating, will cause fresh material discharged into the conveyor to accumulate under the supply conduit and cut off further supply even if the conduit, as for example at 38A, is above the conveyor; the material in this case forming in a pile 97 above the level 68 to cut off flow from the conduit 38A.

In Fig. 8 is shown another embodiment of the invention, a brief description being sufficient in view of the more complete description of the preceding forms.

The supply conveyor 2 is vibrated in this case from its downstream end by the connector 6 going to the "motor driven vibrator" shown diagrammatically. Both ends of the conveyor are closed by end walls 98 and 99. The conveyor floor 3 is shown as having three outlets 100 to 102. The outlet 102 communicates by a conduit 103 with a supply reservoir or tank 104 having a withdrawal conduit 105 whereby the reservoir may be kept full up to a level 106. The outlets 100 and 101 in this case communicate by flexible conduits 107 and 108 with conduits 109 and 110; and as illustrating the adaptability of the invention to distribute material for various uses, these conduits 109 and 110 are shown as going directly to an apparatus or process or receiver to be supplied, without an intermediate reservoir or tank in which material is stored at a predetermined level.

Material is led to the upstream end of the conveyor floor 3 by the conduit 111 to which material is supplied from any suitable source. If preferred, the feed conduit 111 may be the outlet of a hopper and supplied with material as shown in Fig. 7 from a supply conveyor.

Immediately above or adjacent to each of the outlets 100 to 102 are float balls 112 to 114 connected to arms 84 pivotally supported at bearings 83 and carrying mercury tube electric switches 115 to 117; and the position of the ball above the floor 3 in each case being adjustable by the element 89, the arrangement here shown in simplified form being like or similar to that shown and described in more detail in Fig. 7, the parts being identified by the same reference characters as those in Fig. 7.

Material supplied by the conduit 111 to the floor 3 is conveyed thereover in a stream 118 and discharges through the outlets 100 to 102, supplying material to the withdrawal conduits 105, 109, and 110 and at a rate which for an average of withdrawal will fill them and form mounds 119—119 at the outlets; and for the minimum rate of aggregate withdrawal, or, if the withdrawal is cut off, the material supplied will begin to rise on the floor 3 in the said thick layer and may ultimately attain the level 120; and the floats 112 to 114 will accordingly float up in or on this thick layer.

The switches 115 to 117 are all connected in parallel with wires 121 and 122, the wire 121 being connected to the "motor driven vibrator" and the wire 122 to a current supply main 123, the other supply main 124 being connected by a wire 125 to the "vibrator." When all three of the floats 112 to 114 have operated to open their corresponding switches 115 to 117, the "motor driven vibrator" will thereby be de-energized and vibration of the conveyor will stop. Thereafter, if the demand of any one of the conduits 105, 110, or 109 increases (or is resumed) the material in the layer 120 immediately above the corresponding outlet will collapse downwardly through the outlet and into the conduit and allow the float thereat to fall and close its corresponding switch, and the switches all being connected in parallel, closure of any switch will again start the "vibrator" and redistribute the layer 120 or draw more material from the conduit 111 to maintain the supply to the withdrawal conduits.

As to the withdrawal conduits 109 and 110, the thick layer of material 120 on the floor 3 functions in effect as a storage reservoir.

By having all of the switches 115 to 117 in parallel, the conveyor will be continued in vibration, under the circumstances mentioned, until all of the outlets 100 to 102 are covered with a thick layer of material; and by providing the floats 112 to 114 adjacent to the outlets there is no liability that, after the conveyor has stopped vibrating, an increased demand by any one of the withdrawal conduits can exhaust the supply above the corresponding outlet.

When as referred to above, and optionally, the feed conduit 111 is supplied from a supply conveyor such as that at 29 in Fig. 7, the vibration of the supply conveyor 29 can also be stopped when vibration of the distributing conveyor 2 is stopped, and this can be done by connecting the motor driven vibrator 91 of Fig. 7 to wires 126 and 127 of Fig. 8, and it is believed that this will be understood by those skilled in the art without further illustration or description.

In Fig. 9 is shown another embodiment of the invention. In some cases, the discrete material distributed by the conveyor to the withdrawal conduits as described hereinbefore, may be utilized at or in a process requiring that the material be maintained in the process under superatmospheric pressure, or subatmospheric pressure, or under some preselected ambient atmosphere (for example a preselected gas); and my invention is applicable to such a process-supplying use; and one such embodiment is shown in Fig. 9.

The distributing conveyor is shown generally at 128 and comprises: the floor 3, end walls 129 and 130, and side walls 4 and 5 (the wall 5 only being shown) and a top wall 131, all of the walls being sealingly joined together so that the conveyor is in the form of an hermetically sealed box. A feed conduit 132 projects through the top wall 128 and is hermetically sealed thereat and by means of a flexible coupling conduit 133 is sealingly connected to a feed hopper 134. The mode of operation contemplates that the hopper 134 will be filled with a quantity of material and then sealed at its top, the sealing arrangement comprising a flange 135 on the hopper and a flange 136 on a hopper cover 137 clamped sealedly together, by removable clamp devices 138 of well known construction.

Three outlets are shown in the conveyor floor 3 at 139 to 141 hermetically sealed to flexible conduits 242 to 244, the lower ends of these conduits being connected and hermetically sealed to material reservoirs 142 to 144, from which material is conducted by withdrawal conduits 145 to 147.

The flexible conduits 133 and 242 to 244 may conveniently be made of metal and of bellows type, and brazed or welded to their associated parts at their ends.

Material supplied through the conduit 132 to the floor 3 of the conveyor distributes through the outlets as hereinbefore described in connection with the other forms, during which operation the material may flow over the floor 3 and fill all of the outlets and their associated conduits and then may fill the box-like conveyor up to a layer level 148 and cut off at the conduit 132, etc.

The box-like conveyor is vibrated by the connector 6.

The process apparatus to which the withdrawal conduits 145 to 147 conduct the material are not shown, but it is contemplated that they will handle the material delivered to them in such manner that it may in the process be kept in hermetically sealed apparatus. For example, with reference to the withdrawal conduit 147 of Fig. 9, the discrete material may discharge into a process apparatus 185 in which the material becomes a liquid or semi-liquid as at 186, both in the apparatus and in the lower end of the conduit; and that in the conduit seals it at its lower end. This or a like or similar provision may obtain for the other discharge conduits 145—146. The entire apparatus of Fig. 9 may therefore, interiorly, be put under pressure, or vacuum, or filled with gas, and one means for doing this is shown. A reversible motor driven pump 149 is connected by a pipe 150 to the supply hopper 134, and by means of a handle or lever or other control 15, may be caused to pump air from the atmosphere through a conduit 152, and through a two way valve 153, and through the pump, and pipe 150, into the hopper 134, and thereby raise the pressure in the entire system above atmospheric pressure; and the degree of pressure may be determined by a pressure operated switch 154 connected to one of the receivers 142 to 144, which when it operates cuts off the current from current supply mains 155 and 156 which drives the motor driven pump by a circuit that will be apparent from the drawing.

In like manner and optionally, upon reversing the motor driven pump, air within the sealed system may be discharged outwardly through the pipe 152, to develop vacuum in the apparatus.

Upon turning the valve 153 clockwise for a quarter of a revolution, it will connect the pump and the pipe 150 to a source of gas 157. Gas may thus be admitted to the closed and sealed system after it has been exhausted as described above.

By this means for example, the system may be exhausted to withdraw the air and its oxygen; and nitrogen may be injected into the system; and the material in the system as well as the material in the process apparatus 185 may all be purged of oxygen and kept in the neutral nitrogen atmosphere.

In the above described forms of the inventions, the receivers or reservoirs, in which material from the distributing conveyor 2 is discharged, are shown as stationary reservoirs, always functioning in the operation of the system. In Fig. 10 is shown a modification in which a receptacle 158 is supported upon a support 159 and removable therefrom. In the operation of the apparatus with which such a receptacle 158 is associated, after it has filled up to the predetermined level 160 at the lower end of the conduit 161, in the manner described hereinbefore, the conduit 161 may be closed off by a handle operated valve 162, and then the receptacle 158 and its contents may be removed from the support 159. One such use of the invention therefore will be to fill any kind of a receptacle with a predetermined amount or batch of material, distributed thereto from a point along the flowing stream of material on the vibrating conveyor as will be understood; and several of such receptacles may be provided for a succession of conveyor floor outlets.

In Fig. 11 is shown another way to make a leak-proof connection between a conduit and a discharge outlet of the conveyor floor. Instead of making an actual leak-tight connection between the upper end of the conduit and the conveyor floor at the outlet, as in the preceding figures, a short conduit 163, not necessarily flexible, is connected to the conveyor floor 3 in alignment with the outlet, and projects downwardly into a larger conduit 164. Material discharged out of the outlet and through the conduit 163 and into the larger conduit 164 can only rise to the lower end of the conduit 163, and will there be blocked off; and the material cannot leak out of the upper end of the conduit 164 so that a leak-proof conduit communication with the floor outlet is provided.

As indicating the scope of the invention, and referring to Figs. 12 and 13, the feed conduit 166, supplying material to the conveyor floor 3, may extend all the way across the floor from the side wall 4 to side wall 5; and Fig. 13 shows that any one of the outlets, for example the outlet 167, may be left unused, or put out of use, at any time, by a hand operated valve 168. A mound 169 will thereupon form at the outlet 167 as described hereinbefore, and material on the floor 3 will flow over and beyond the outlet 167 to other outlets therebeyond, very much as if the outlet 167 were absent entirely.

As further indicating the scope of the invention, Figs. 14 and 15 show that the outlets in the conveyor floor 3 do not have to extend all the way across the floor as in the other figures, but may be shorter transversely, and relatively staggered across the floor. Material supplied to the conveyor floor by the supply conduit 173 which extends from the side wall 4 to the side wall 5, will flow over the floor 3 in a full width stream. A side portion of the stream adjacent to the wall 5 will enter an outlet 170; and while discharge thereinto is going on, the middle part of the stream will go on and discharge into an outlet 171; and while the two outlets 170 and 171 are discharging material the other side of the stream adjacent to the side wall 4, will flow on to and discharge into an outlet 172. After the outlet 170 has filled, and the mound 174 has formed thereat, the material will flow over the outlet 170 and will encounter a diagonal wall 175 and will thereby be directed into the outlet 171; and when the outlet 171 has been filled and the mound 176 has formed thereat, the material will flow thereover and be directed by a diagonal wall 177 into the outlet 172.

The outlet 172 will therefore be supplied with material at a greater rate than the outlet 171, and the outlet 171 at a greater rate than the outlet 170. When it is known that the apparatus or process to be supplied by material discharged through the outlets is greater for one than for another, or, when it is known that one may have a greater fluctuation of demand than another, the apparatus or process developing the greatest demand or greatest fluctuation, would be connected to the outlet 172, and the one having a lesser rate of demand or a lesser degree of fluctuation, would be connected to receive material discharged from the outlet 172, and the one having the least rate of demand or fluctuation would be connected to receive material through the outlet 170.

A hand operated valve 178 is associated with the outlet 171 as indicating that that outlet or any other outlet may be put out of use from time to time.

The valves 168 and 178 of Figs. 13 and 15 besides being operated as described to close off the flow through their associated outlets, may be partly closed to throttle the discharge flow, thereby in effect changing the size of the outlet; and thus, while all of the outlets in the vibrating floor may be made of uniform size for economy of fabrication, their effective relative sizes may be adjustably varied by such partly closed valves whenever such variation is desirable.

As referred to hereinbefore, the depth of the said flowing stream of discrete material toward the floor outlets; and the height to which the said mounds form over the outlets; and the depth to which the said layer rises on the floor; will be different for materials of different weight, size of discrete pieces, etc.

In the foregoing as in Figs. 7 and 8, a float operated device is shown and described as operated by a float on the said layer.

In some cases, the said mound will form over the oulet sufficiently high to operate such float device; and in Figs. 16 and 17 is shown a modification in which, as in Fig. 16 the float 180 is normally at a low position over the outlet 181 and allows the material to flow under it as at 182 through the outlet; and, as in Fig. 17, when the outlet fills and the mound 183 forms over it, the mound raises the float.

The contactor 184 operated by the float 180 may be used to control an electric circuit for any purpose such for example as the purposes of the contactors of Figs. 7 and 8.

In installations in which material is conducted away from a number of floor outlets all at approximately the same rate, or in which this rate increases or decreases approximately alike for all the outlets, a single float operated contactor at one of the outlets, instead of one for each outlet, and operated either by the said accumulating layer as in Fig. 8, or by the said mound as in Figs. 16 and 17 will suffice; as will be understood.

I claim:

1. In a discrete material conveying and distributing apparatus, a conveyor comprising an elongated floor; a succession of longitudinally spaced always unobstructed outlets in the floor; a conduit under each outlet communicating therewith in a leakproof manner; means by which vibratory movement may be communicated to the floor in a manner to cause discrete material when supplied to the floor to flow thereover longitudinally in a stream, and to cause it to discharge by gravity through the outlets to be conducted away by the conduits, and to cause it to fill any conduit and outlet and maintain them filled at all times when the rate of conducting away by the conduit is less than the rate of discharge through the outlet, the vibratory movement and the unobstructed outlets causing the stream to flow over and beyond the filled outlet to the next successive outlet; means for supplying discrete material to an upstream portion of the floor; an end wall obstruction at a downstream portion of the floor, the vibratory movement and the obstruction causing the excess of the stream, when all of the outlets are filled, to flow upstream and accumulate in a layer on the floor and over the outlets; and means actuated by the accumulation of material in said layer to interrupt the supply of material to the floor.

2. In a discrete material conveying and distributing apparatus, a conveyor comprising an elongated floor supported for vibratory movement; a succession of longitudinally spaced always unobstructed outlets in the floor; a conduit under each outlet communicating therewith in a leakproof manner; vibratory means to vibrate the floor in a manner to cause discrete material when supplied to the floor to flow thereover longitudinally in a stream, and to cause it to discharge by gravity through the outlets to be conducted away by the conduits, and to cause it to fill any conduit and outlet and maintain them filled at all times when the rate of conducting away by the conduit is less than the rate of discharge through the outlet, the vibratory movement and the unobstructed outlets causing the stream to flow over and beyond the filled outlet to the next successive outlet; an end wall obstruction at a downstream portion of the floor the vibratory movement and the obstruction causing the excess of the stream, when all of the outlets are filled, to flow upstream and accumulate in a layer on the floor and over the outlets; and means actuated by the accumulation of material in said layer to interrupt vibration of the floor by the vibrator means.

3. In a discrete material conveying and distributing apparatus, a conveyor comprising an elongated floor supported for vibratory movement; a succession of longitudinally spaced always unobstructed outlets in the floor; a conduit under each outlet communicating therewith in a leakproof manner; vibratory means to vibrate the floor in a manner to cause discrete material when supplied to the floor to flow thereover longitudinally in a stream, and to cause it to discharge by gravity through the outlets to be conducted away by the conduits, and to cause it to fill any conduit and outlet and maintain them filled at all times when the rate of conducting away by the conduit is less than the rate of discharge through the outlet, the vibratory movement and the unobstructed outlets causing the stream to flow over and beyond the filled outlet to the next successive outlet; an end wall obstruction at a downstream portion of the floor the vibratory movement and the obstruction causing the excess of the stream, when all of the outlets are filled, to flow upstream and accumulate in a layer on the floor and over the outlets; a float device disposed to float upon and be elevated by the accumulation of material in said layer; and means actuated by elevation of the float device to interrupt vibration of the floor by the vibrator means.

4. In a vibratory conveying and distributing apparatus, a vibratory conveyor comprising spaced side walls, and a floor therebetween supported to be vibrated; means by which vibratory movement may be communicated to the floor in a manner to cause material supplied thereto to flow thereover longitudinally in a stream; a gravity feed material supply conduit at an upstream portion of the floor having a discharge end spaced from the floor to predetermine the rate of supply; a plurality of always unobstructed outlets in the floor in succession in the path of the stream, through which material may discharge by gravity; a conduit under each outlet communicating with the stream through the outlet in a leakproof manner, to receive and conduct away discharged material; the conveyor having a transverse end wall obstruction joining the bottom and side walls at a downstream portion of the floor beyond the last successive outlet; the vibration and the unobstructed outlets causing any conduit and outlet to become filled and for causing the stream to flow over and beyond the filled outlet at all times when the rate at which material is discharged to the conduit through its associated outlet exceeds the rate at which it is conducted away by the conduit; and when all of the outlets are filled the vibration and obstruction causing the stream to flow upstream and accumulate over the outlets in a layer on the floor and against the end wall and between the side walls, and under and submerging the supply conduit end, and thereby discontinuing further supply of material from the supply conduit end.

5. In a vibratory conveyor apparatus, a vibratory conveyor comprising an hermetically sealed walled chamber having an elongated floor; a longitudinal succession of outlets in the floor; a conduit under each outlet hermetically sealed to the chamber floor and communicating through the outlet with the chamber interior; a gravity feed discrete material supply reservoir, adapted to be charged with material and then hermetically sealed; a supply conduit extending from the reservoir into the chamber through a chamber wall and hermetically sealed to the chamber and reservoir; and having a terminal end spaced a predetermined distance above the chamber floor to supply material to the stream on the floor and to predetermine the rate of supply; means by which vibratory movement may be communicated to the chamber and floor to vibrate the floor to cause material supplied to the floor to flow thereover in a stream; and to be discharged through the outlets, and into the conduits and conducted away by the conduits; and to cause any conduit and outlet to become filled and the stream to flow over the filled outlet at all times when the rate at which material is discharged into any conduit exceeds the rate at which it is conducted away by the conduit, and, when all of the outlets are filled, to cause the stream of material to accumulate over the outlets, and rise in the chamber in a layer on the floor and under the supply conduit end and discontinue further supply of material.

6. In a conveying and distributing vibratory conveyor apparatus, a conveyor comprising a floor; an always unobstructed outlet in the floor; a conduit under the outlet communicating therewith; the floor being associated with means by which vibratory movement may be communicated thereto in a manner to cause discrete material supplied to the floor to flow thereover in a stream and be discharged through the outlet and into the conduit and be conducted away by the conduit; the unobstructed outlet and the vibratory movement causing discharged material to fill the conduit and outlet and accumulate in a mound over the outlet and flow in a stream beyond the mound when the rate of conducting away by the conduit is less than the rate of discharge into it; and means actuated by accumulation of material in the mound to interrupt vibration of the floor by the vibrator means.

7. In a conveying and distributing vibratory conveyor apparatus, a conveyor comprising a floor; an always unobstructed outlet in the floor; a conduit under the outlet communicating therewith; the floor being associated with electrically energizable vibrator means by which vibratory movement may be communicated thereto in a manner to cause discrete material supplied to the floor to flow thereover in a stream and be discharged through the outlet and into the conduit and be conducted away by the conduit; the always unobstructed outlet and the vibratory movement causing discharged material to fill the conduit and outlet and then flow downstream over the outlet when the rate of conducting away by the conduit is less than the rate of discharge into it; a transverse wall obstruction on the floor at the downstream side of the outlet; the obstruction and the vibratory movement causing a stream of material to flow in the up stream direction and form in a layer over the filled outlet; a float device disposed to float upon and be elevated by the accumulation of material in said layer, and electric contactor and circuit means actuated by elevation of the float device to interrupt energization of the vibrator means.

8. In a conveying and distributing vibratory conveyor apparatus, a conveyor comprising a floor; an outlet in the floor; a conduit under the outlet communicating therewith; the floor being provided with means by which vibratory movement may be communicated thereto to cause discrete material supplied to the floor to flow thereover in a stream and be discharged through the outlet and into the conduit and be conducted away by the conduit; and to cause discharged material to fill the conduit and outlet and form in a mound at all times over the outlet and flow in a stream beyond the mound when the rate of conducting away by the conduit is less than the rate of discharge into it; a float-operated electric contactor comprising a float element disposed adjacent to the outlet and floating upwardly on the mound as it forms, and then operating the contactor.

9. In a conveying and distributing vibratory conveyor apparatus, a conveyor comprising a floor; an always unobstructed outlet in the floor; a transverse wall obstruction on the floor at one side of the outlet; a conduit under the outlet communicating therewith; the floor being provided with means by which vibratory movement may be communicated thereto in a manner to cause discrete material supplied to the floor to flow thereover in a stream and be discharged through the outlet and into the conduit and be conducted away by the conduit; the unobstructed outlet, the vibratory movement and the obstruction, causing discharged material to fill the conduit and outlet and form in a layer of material over the outlet at all times when the rate of conducting away by the conduit is less than the rate of discharge into it; a float-operated electric contactor comprising a float element disposed to float upwardly on the layer and operate the contactor.

10. In a discrete material conveying and distributing apparatus, a conveyor comprising an elongated floor; an outlet opening in a longitudinally intermediate portion of the floor; a conduit under the outlet communicating therewith in a leakproof manner; a material receptacle under the conduit into which the conduit projects, the receptacle having a material discharge outlet below the end of the conduit; means to supply discrete material at least at a minimum predetermined rate to a portion of the floor; means to vibrate the floor longitudinally; means supporting the floor to cause the material to flow thereover in a stream when the floor is vibrated, and to cause the material to be discharged by gravity through the outlet and conduit and the outlet opening being always open, and the opening and the bed vibrations causing the material discharged through the conduit to fill the receptacle up to a level at the end of the conduit and then fill the conduit and outlet opening and flow over, and beyond the outlet opening in a stream and maintain the material in the receptacle at said level, at all times when the rate of discharge from the receptacle at its discharge outlet is less than the rate of supply to the conveyor.

11. In a discrete material conveying apparatus, a conveyor comprising an elongated floor; a material supply conduit at one portion of the floor having a discharge end adjacent to the floor to supply material by gravity to the floor; means to vibrate the floor longitudinally and means to support the floor to cause material supplied to the vibrating floor to move in a stream thereover away from the supply conduit; a stream flow obstruction at a downstream portion of the floor;

the obstruction and bed vibrations causing the stream upon reaching the obstruction to accumulate in a layer on the floor from said obstruction to the conduit end and to submerge the conduit end and thereby discontinue supply of material to the floor.

12. In a conveying and distributing vibratory conveyor apparatus, a conveyor comprising a floor; an always unobstructed outlet in the floor; a conduit under the outlet communicating therewith; the floor being associated with means by which vibratory movement may be communicated thereto in a manner to cause discrete material supplied to the floor to flow thereover in a stream and be discharged through the outlet and into the conduit and be conducted away by the conduit; the unobstructed outlet and the vibratory movement causing discharged material to fill the conduit and outlet and accumulate in a mound over the outlet and flow in a stream beyond the mound when the rate of conducting away by the conduit is less than the rate of discharge into it; a float device disposed to float upon and be elevated by the accumulation of material in the mound; and means actuated by elevation of the float device to interrupt vibration of the floor by the vibrator means.

13. In a conveying and distributing vibratory conveyor apparatus, a conveyor comprising a floor; an always unobstructed outlet in the floor; a conduit under the outlet communicating therewith; the floor being associated with electrically energized vibrator means by which vibratory movement may be communicated thereto in a manner to cause discrete material supplied to the floor to flow thereover in a stream and be discharged through the outlet and into the conduit and be conducted away by the conduit; the unobstructed outlet and the vibratory movement causing discharged material to fill the conduit and outlet and accumulate in a mound over the outlet and flow in a stream beyond the mound when the rate of conducting away by the conduit is less than the rate of discharge into it; a float device disposed to float upon and be elevated by the accumulation of material in the mound; and an electric circuit and contactor means actuated by elevation of the float device to interrupt energization of the vibrator means and vibration of the floor thereby.

14. In a conveying and distributing vibratory conveyor apparatus, a conveyor comprising a floor; an always unobstructed outlet in the floor; a conduit under the outlet communicating therewith; the floor being associated with means by which vibratory movement may be communicated thereto in a manner to cause discrete material supplied to the floor to flow thereover in a stream and be discharged through the outlet and into the conduit and be conducted away by the conduit; the unobstructed outlet and the vibratory movement causing discharged material to fill the conduit and outlet and accumulate in a mound over the outlet and flow in a stream beyond the mound when the rate of conducting away by the conduit is less than the rate of discharge into it; and means actuable responsive to accumulation of material in the mound to interrupt the supply of material to the floor.

References Cited in the file of this patent
UNITED STATES PATENTS

| Number | Name | Date |
|---|---|---|
| 635,318 | Heavey | Oct. 24, 1899 |
| 1,304,553 | Gadd | May 27, 1919 |
| 1,322,469 | Ross | Nov. 18, 1919 |
| 1,475,596 | Redler | Nov. 27, 1923 |
| 2,027,697 | Nielsen | Jan. 14, 1936 |
| 2,386,717 | Sample | Oct. 9, 1945 |
| 2,412,137 | Fink | Dec. 3, 1946 |